(12) United States Patent
Poon et al.

(10) Patent No.: US 6,192,070 B1
(45) Date of Patent: Feb. 20, 2001

(54) UNIVERSAL MODEM FOR DIGITAL VIDEO, AUDIO AND DATA COMMUNICATIONS

(75) Inventors: Tommy C. Poon, Murray Hill; Jay Bao, Bridgewater, both of NJ (US); Yoshiki Mizutani, Takarazuka; Hiroyuki Nakayama, Kyoto, both of (JP)

(73) Assignee: Mitsubishi Electric Research Laboratories, Inc., Cambridge, MA (US)

(*) Notice: Under 35 U.S.C. 154(b), the term of this patent shall be extended for 0 days.

(21) Appl. No.: 09/002,438

(22) Filed: Jan. 2, 1998

(51) Int. Cl.[7] .............................. H04B 1/38; H04L 5/16; H04L 27/00
(52) U.S. Cl. .................. 375/222; 375/259; 375/295; 375/316; 332/185; 329/372
(58) Field of Search ................................ 375/222, 219, 375/259, 285, 324, 328, 346, 296, 284, 232, 377, 340; 455/501; 708/323; 332/185; 329/372

(56) References Cited

U.S. PATENT DOCUMENTS

| | | | |
|---|---|---|---|
| 5,040,192 | * 8/1991 | Tjahjadi | 375/324 |
| 5,367,563 | * 11/1994 | Sainton | 379/98 |
| 5,550,881 | * 8/1996 | Sridhar et al. | 375/322 |
| 5,577,087 | * 11/1996 | Furuya | 375/222 |
| 5,671,253 | * 9/1997 | Stewart | 375/316 |
| 5,706,428 | * 1/1998 | Boer et al. | 370/342 |
| 5,764,699 | * 6/1998 | Needham et al. | 375/261 |
| 5,982,807 | * 11/1999 | Snell | 375/200 |
| 5,982,819 | * 11/1999 | Womack et al. | 375/259 |
| 5,991,337 | * 11/1999 | Giles | 375/222 |

\* cited by examiner

*Primary Examiner*—Stephen Chin
*Assistant Examiner*—Betsy L. Deppe
(74) *Attorney, Agent, or Firm*—Dirk Brinkman

(57) ABSTRACT

A universal modem has a software-configurable modulator/demodulator which accommodates different modulation formats such as those associated with terrestrial, cable, phone line, satellite and wireless communications to be transmitted and received through a single device in which the modem has reconfigurable logic to accommodate the format of the signals being received or transmitted. In one embodiment, the system tracks channel noise and changes modulation format at both the transmit and receive sides of the system through the use of a controller that controls both sides.

19 Claims, 14 Drawing Sheets

TRANSMITTING SIDE

RECEIVING SIDE $$x(n) = I(n)\cos\theta(n-1) - Q(n)\sin\theta(n-1)$$
$$y(n) = I(n)\sin\theta(n-1) + Z(n)\cos\theta(n-1)$$

$$X(n) = \sum_{i=0}^{m-1} C_i \cdot x(n-i)$$

$$Y(n) = \sum_{i=0}^{m-1} C_i \cdot y(n-i)$$

$$\Delta\theta(n) = \tan^{-1}\left(\frac{Y(n)}{X(n)}\right) - E\left\{\tan^{-1}\left(\frac{Y(n)}{X(n)}\right)\right\}$$

$$\theta(n) = f(\Delta\theta(n))$$

$f$: LOOP TRANSFER FUNCTION $$ex.)^- f(\theta_i) = -\sum_{k=-\infty}^{i} \theta_k$$

$I(n), Q(n)$: DATA INPUT FROM A/D CONVERTER
    AT THE TIME $nT$ ($T$ = SAMPLING PERIOD)

$C_i$: COEFFICIENTS OF ROLLOFF FILTER.
    ($0 \leq i < m$)

$m$: NUMBER OF TAPS OF ROLLOFF FILTER.

$E\{\ \}$: FORECAST OF IDEAL ANGLE.

Fig. 9

MEMORY 1

| CHANNEL 1 | VSB MODULATION FORMAT | A FREQUENCY BANDWITH |
|---|---|---|
| CHANNEL 2 | QAM MODULATION FORMAT | B FREQUENCY BANDWITH |
| CHANNEL 3 | QPSK MODULATION FORMAT | C FREQUENCY BANDWITH |
| CHANNEL 4 | DMT MODULATION FORMAT | D FREQUENCY BANDWITH |
| CHANNEL 5 | CDMA MODULATION FORMAT | E FREQUENCY BANDWITH |
| CHANNEL 6 | TDMA MODULATION FORMAT | F FREQUENCY BANDWITH |

Fig. 14

MEMORY 2

| CHANNEL 1 | A FREQUENCY | a FREQUENCY BANDWITH |
|---|---|---|
| CHANNEL 2 | B FREQUENCY | b FREQUENCY BANDWITH |
| CHANNEL 3 | C FREQUENCY | c FREQUENCY BANDWITH |
| CHANNEL 4 | D FREQUENCY | d FREQUENCY BANDWITH |
| CHANNEL 5 | E FREQUENCY | e FREQUENCY BANDWITH |
| CHANNEL 6 | F FREQUENCY | f FREQUENCY BANDWITH |

Fig. 15

MEMORY 3

| CHANNEL 1 | VSB MODULATION FORMAT | A FREQUENCY | a FREQUENCY BANDWITH |
|---|---|---|---|
| CHANNEL 2 | QAM MODULATION FORMAT | B FREQUENCY | b FREQUENCY BANDWITH |
| CHANNEL 3 | QPSK MODULATION FORMAT | C FREQUENCY | c FREQUENCY BANDWITH |
| CHANNEL 4 | DMT MODULATION FORMAT | D FREQUENCY | d FREQUENCY BANDWITH |
| CHANNEL 5 | CDMA MODULATION FORMAT | E FREQUENCY | e FREQUENCY BANDWITH |
| CHANNEL 6 | TDMA MODULATION FORMAT | F FREQUENCY | f FREQUENCY BANDWITH |

Fig. 20

UNIVERSAL MODEM FOR DIGITAL VIDEO, AUDIO AND DATA COMMUNICATIONS

FIELD OF INVENTION

This invention relates to modulators and demodulators and, more particularly, to a universal modem which is configurable to process one of a number of modulation formats.

BACKGROUND OF INVENTION

In recent years due to the rapid development of multimedia, digital, audio and video communication applications, there is a necessity for efficient and reliable signal modulation and demodulation techniques to accommodate different modulation formats chosen based on the media over which the signals are to be transmitted.

For instance, with respect to high definition television, and in fact other types of advanced television transmissions, program material in video, data or audio form is formatted by a channel encoder so as to be transmittable by Vestigial Side Band modulation or VSB which is typical for over-the-air television transmissions. On the other hand, Quadrature Amplitude Modulation or QAM is typically used for cable transmission, whereas Quadrature Phase Shift Keying or QPSK is generally used in satellite communication. Finally, discrete multitone or DMT techniques are typically used for telephone landline signaling such as with Asymmetric Digital Subscriber Lines or ADSL.

It will be appreciated that when a video source at the transmit side is encoded through a source coding unit, the source coding unit is set up to code the video source material in one of the four above-mentioned modulation formats. Likewise, on the receive side, in order for a receiver to decode all of the abovementioned formats discrete VLSI chips or detectors can be provided in parallel, with the outputs going to source decoding.

It will be readily apparent that because there is presently no universal modulation format, receivers destined to be utilized not only for over-the-air transmissions, but also for cable must at least have the capability of decoding the appropriate modulation format. While it is possible to use a parallel brute force approach by merely providing the receive side with a series of demodulators each configured to demodulate a particular format, this approach is costly and error-prone.

As to the parallel approach mentioned above, it is possible to design a modem in which the input signal is fed from the RF-IF stage of the receiver in parallel to each of four demodulators, with the output of each demodulator being switched to source decoding depending on the modulation format of the received signal. Modulation format can be determined in some instances by the channel to which the receiver is tuned, although this can vary from country to country.

For instance, in the United States, for VHF channels 1–13 and UHF channels, VSB modulation is used, with the VSB demodulator switched to source decoding. For the cable channels, generally over Channel 68, QAM modulation is used, with the output of the QAM demodulator switched to source decoding. For satellite channels, QPSK modulation is used, with the QPSK demodulator switched to source decoding, whereas for telephone line usage, assuming a channel indicating landline transmission, it is the DMT output of a demodulator which is switched to source decoding.

This duplication of demodulators aside from being four times the expense of a single demodulator, also has the following problems: First and foremost, it will be appreciated that in order to switch the outputs of the various demodulators to source decoding, the output of the demodulators must have a high impedance to damp switching transients and like anomalies. Secondly, care must be taken to eliminate cross modulation between the different demodulators.

It will thus be appreciated that any parallel processing solution to the problem of multiple modulation formats generally resolves itself into a question of the cost associated with duplicating demodulators and technical complexity which is indeed a factor in mass marketed multimedia receivers for which such demodulator cost duplication and complexity is unacceptable.

On the transmit side, for multimedia transmissions requiring different modulation formats, duplicating modulators are likewise expensive and error-prone in much the same way as described above with respect to demodulators. Also, with specialty services such as data to be provided on different channels, oftentimes the modulation format is different from that of the main transmission. To provide such additional services ordinarily would require separate modulators having the expected cost impact.

SUMMARY OF THE INVENTION

Rather than multiplying the number of demodulators and modulators to be able to demodulate the differing modulation formats and to provide for differing modulation formats, in the subject invention, a universal modem is provided which is based on reconfigurable logic for its demodulator as well as its modulator. In a preferred embodiment, a controller is used to control the modulation type on both the transmit and receive side with means provided to sense channel noise and change the modulation type accordingly.

In one embodiment, a host computer at the receive side detects the modulation type and reconfigures the demodulator in universal modem to demodulate the format of the incoming signal.

In this embodiment in the receive mode, a host computer detects the modulation type of the incoming signal by detecting the channel to which the receiver is tuned and setting the demodulator to the expected format. Thus if the receiver is tuned to a given channel, then the universal modem is reconfigured to the expected format of signals on that channel. This is done on an a priori basis since different groups of channels have different standardized formats.

Alternatively, the host computer can detect the format of the incoming signal by detecting a flag in the header of the incoming data stream indicating modulation type, assuming one is loaded into the header at the transmit side. This type of demodulation selection does not require a priori knowledge of the correlation of channel with modulation type. As will be appreciated, in different countries different channels are assigned to different types of service which makes this alternative method of ascertaining the channel modulation type attractive. The above, of course, requires that a modulation type flag be generated in the source coding at the transmit side.

In one example of the use of the universal modem in the ATV or advanced television transmission mode, assume that video data is to be transmitted in the MPEG format, where MPEG stands for Motion Picture Expert Group and where one utilizes the MPEG-2 format currently in vogue. Video information is source coded in MPEG in which 188 bytes of information are transmitted as a packet. Channel coding which defines the modulation format is imposed on top of the source coding to provide error correction which adds typically 20 more bytes of information to the data stream.

After the video information has been source coded and channel coded by the software-configurable modulator for a given format, it is ready for transmission. Note that prior to the transmission of the data, a header, e.g. a 3-bit header word: 000=VSB, 001=QAM, 010=DMT etc., can be inserted into the channel coding so as to provide an indication of the modulation type.

While the above has been described in terms of standardized formats for terrestrial, cable, satellite or telephone communications, the universal modem is also applicable to such diverse areas as cellular, PCS and other wireless services to provide automatic reconfiguring of a transceiver to permit its use across different formats. This is especially useful with cellular phone formats CDPD, CDMA, TDMA, FDMA and GSM referring respectively to cellular digital packet data, code division multiplexing, time-division multiplexing, frequency-division multiplexing, and the global mobile system type of modulation. While a cellular phone may be provided in one community for use with CDMA, when the phone roams to an area where TDMA transmissions are utilized, a universal modem within the phone can detect the change and reconfigure the demodulator side of the modem. Likewise, since the cellular system is a full duplex system, the universal modem can be reconfigured in the transmit mode to appropriately format the cellular transmission. It will of course be appreciated that the universal modem can be used with any type of RF transceiver roaming from one area to another where different formats are used, regardless of the type of service that is authorized.

Further, the universal modem is applicable to any kind of digital modulation method. For instance, it can be applied to digital terrestrial broadcasting utilizing the OFDM or Orthogonal Frequency Division Multiplexing method scheduled for use in Europe, Japan and/or other countries.

In one embodiment, the demodulation section of the modem, involves an analog-to-digital converter to provide a digital bit stream to a demodulator which is software-reconfigured in accordance with the output of a configuration RAM. In this embodiment, circuit blocks, elements or modules within the demodulator are linked up to provide a particular type of carrier recovery in accordance with the output of the configuration RAM. In another embodiment, the demodulator is layered, with each layer containing a different carrier recovery circuit. The configuration RAM can call for a given type of demodulation merely by activating one of the layers. This means that in any event, the configuration of the demodulator can be fixed by providing it with blocks, elements or modules that are connected in a particular way on the fly in response to the output of a configuration RAM under the control of a configuration controller. In a further embodiment, the software-configurable demodulator can be implemented in software using a general purpose microprocessor. Note that the above software reconfiguration techniques utilized for the demodulator can likewise be used for a software-configurable modulator.

For over-the-air and cable signals requiring equalization, the output of the configuration RAM may also be utilized to reconfigure an equalizer coupled to the output of the demodulator. Alternatively, when no follow-on signal processing is required, the only element that is to be reconfigured is the demodulator. It will be noted that equalizers are in general used to correct intersymbol interference, whereas in television applications, equalizers are used to cancel ghost images.

As to setting of the universal modem for modulation type or format as mentioned before, flags can be used on the transmission which are detected at the receive side. Alternatively, the channel to which the receiver is tuned can be detected. Moreover, a smart card or other similar device can be used to set the modulation type or format at the receive side. An additional way of detecting modulation type is to demodulate an incoming data stream using all possible formats, detecting the error and setting the demodulator to the modulation type having the lowest error.

In summary, a universal modem has a software-configurable modulator/demodulator which accommodates different modulation formats such as those associated with terrestrial, cable, phone line, satellite and wireless communications to be transmitted and received through a single device in which the modem has reconfigurable logic to accommodate the format of the signals being received or transmitted.

In one embodiment, the system tracks channel noise and changes modulation format at both the transmit and receive sides of the system through the use of a controller that controls both sides.

Note that the modulator or demodulator can be used separately or the two units can be combined and used for transceivers, with either the same software configuring both the modulator and demodulator, or with different software used for the two units. In the receive mode, the universal modem detects the modulation format of the incoming signal and reconfigures the logic of its software-configurable demodulator to output demodulated digital data for further processing. In the transmit mode, information to be transmitted is provided with the appropriate modulation format by setting a software-configurable modulator in the universal modem to the particular format.

In one embodiment, in the receive mode the incoming signal is A-D converted, with a host processor utilized to detect the type of modulation associated with the incoming signal and through a configuration controller configures a random access memory which is coupled to the software-configurable demodulator. In advanced television applications, the demodulated signal is passed through an equalizer, a Trellis Decoder and Reed-Solomon Decoder to provide an appropriate filtered and level-adjusted digital signal that is coupled to the next processing stage.

BRIEF DESCRIPTION OF THE DRAWINGS

These and other features of the subject invention will be better understood taken in conjunction with the Detailed Description in conjunction with the Drawings of which:

FIG. 9 is an algorithm for the demodulation of QPSK/QAM which can be broken into elements and used for the demodulator of FIG. 5A;

FIG. 14 is a table showing the correspondence of channel number to modulation stored in one of the memories of the universal modem in FIG. 10;

FIG. 15 is a table showing the correspondence of channel to frequency stored in one of the memories for the universal modem in FIG. 13;

DETAILED DESCRIPTION

Figure 1:
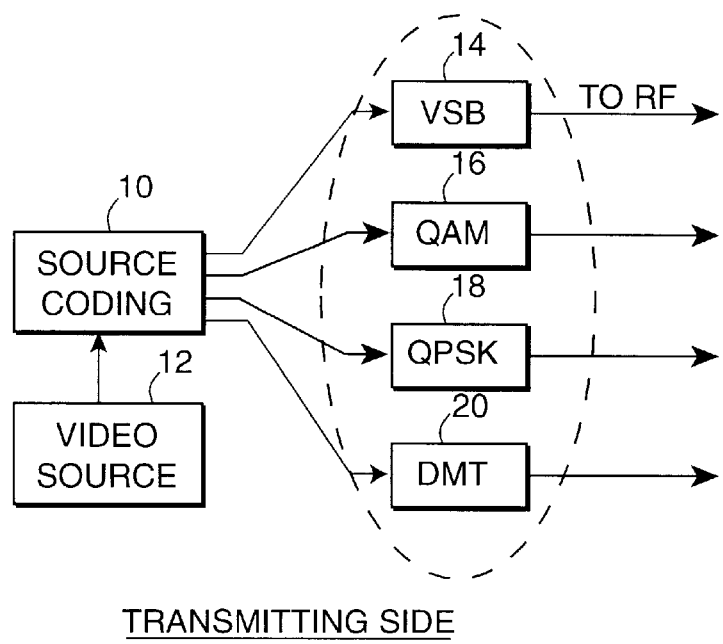
FIG. 1 is a block diagram of the transmit side of a modem indicating the utilization of multiple discrete modulators.
Figure 2:
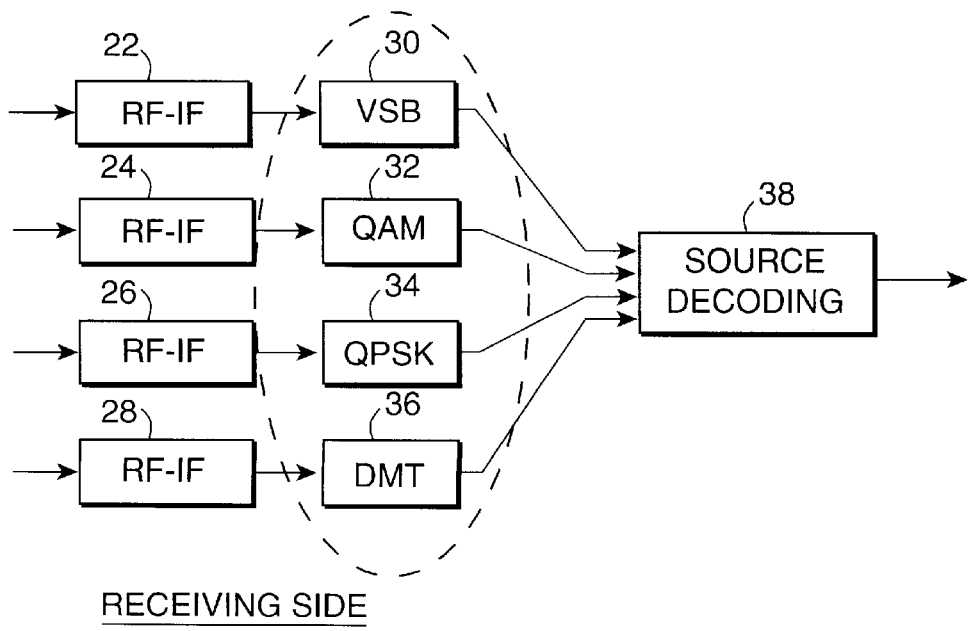
FIG. 2 is a block diagram of the receive side of the modem of FIG. 1 indicating the utilization of multiple demodulators coupled to source decoding, in which the demodulator corresponding to the format of the input signal is switched to source decoding.

As mentioned above, the rapid deployment of multimedia, digital, audio and visual communication applications calls for efficient and reliable signal modulation and demodulation methods. As illustrated in FIGS. 1 and 2, signals transmitted via different media are modulated and demodulated differently. For instance, on the transmit side, source coding 10 takes video content from a video source 12 and encodes it into bit streams, whereupon the output of source coding unit 10 is applied in parallel to modulators 14, 16, 18 and 20 respectively VSB, QAM, QPSK and DMT modulators. The formats for VSB, QAM and QPSK modulation techniques are described in K. Blair Benson, Television Engineering Handbook, Revised Edition, McGraw-Hill, 1992. The format for DMT is described in Bellcore, Framework Generic Requirements for Asymmetric Digital Subscriber Lines, FA-NWT-001397, No. 1, December, 1992 and in "Notice to the Industry: ADSL Equipment", Bellcore Digest of Technical Information, June, 1993, p. 40.

The decision as to which modulation technique is to be utilized in, for instance, terrestrial over-the-air signaling or cable signaling, is founded in both political and technical considerations. Historically, VSB was the format originally used to transmit over-the-air video signals. In the early days of television, Vestigial Side Band Modulation was deemed to be the most efficient modulation method, whereas, with respect to cable, Quadrature Amplitude Modulation gave superior performance. Regardless of the modulation format, there exist numerous modulation schemes which must be accommodated by a universal modem.

On the receive side, as illustrated in FIG. 2, in a parallel processing scheme an incoming signal is down converted by RF-IF converters, here illustrated by reference characters 22, 24, 26, and 28, coupled to respective demodulators 32, 34 and 36.

For ATV receivers, the VSB and QAM modulators are available from major television manufacturers, as well as being under development in a joint development program between Mitsubishi Electronics America and Lucent Technologies, Inc. QPSK demodulators are available from Philips Semiconductors, Part No. TDA8040T, among others. DMT-based ADSL equipment is described in "Notice to the Industry: ADSL Equipment", Bellcore Digest of Technical Information, June, 1993, p. 40. As mentioned hereinbefore, the outputs of these demodulators are switched to a source decoding unit 38, such as the Mitsubishi MH-1000D.

The problem associated with multiple formats is that the number of modulation schemes now contemplated for use and in the future, are multiplying. Presently, there is no way of ascertaining which modulation schemes will dominate. It is therefore incumbent on the manufacturer of transceivers to be able to accommodate as many modulation schemes as possible with a minimum amount of hardware.

Figure 3:
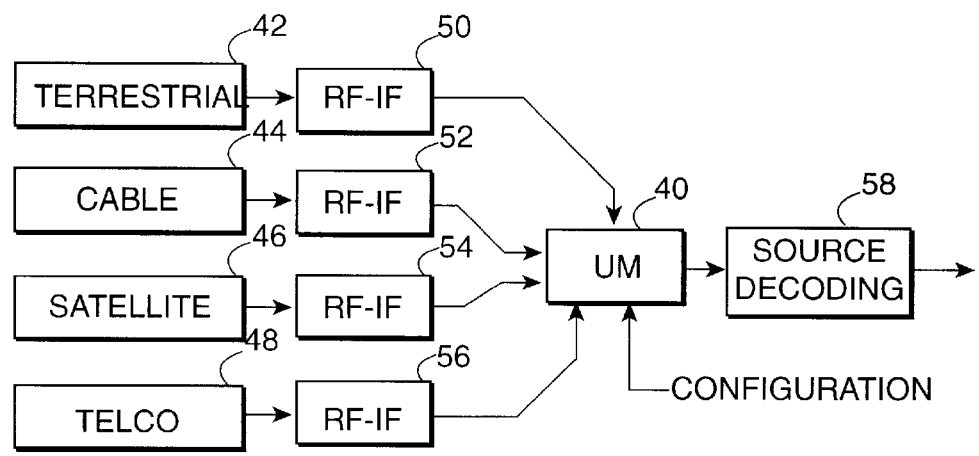
FIG. 3 is a block diagram of the receive side of the subject universal modem indicating multiple inputs of differing formats, with the universal modem detecting which format the incoming signal possesses and then internally reconfiguring itself.

Referring now to FIG. 3 in the subject system on the receive side, a universal modem 40 which is software-reconfigurable has as an input either a terrestrial signal 42, a cable signal 44, a satellite signal 46 or a landline signal 48, each with its own unique modulation format. Here the signals are coupled to respective RF-IF converters 50, 52, 54 and 56. The output of the universal modulator is in turn coupled to conventional source decoding 58.

As will be discussed in FIG. 5A, the universal modem is reconfigurable depending either on the channel to which the receiver is turned, or on detection of format flags. The universal modem is thus provided with configuration control signals derived either through a priori knowledge of the modulation type associated with a channel or actual detection of format flags.

Figure 4:
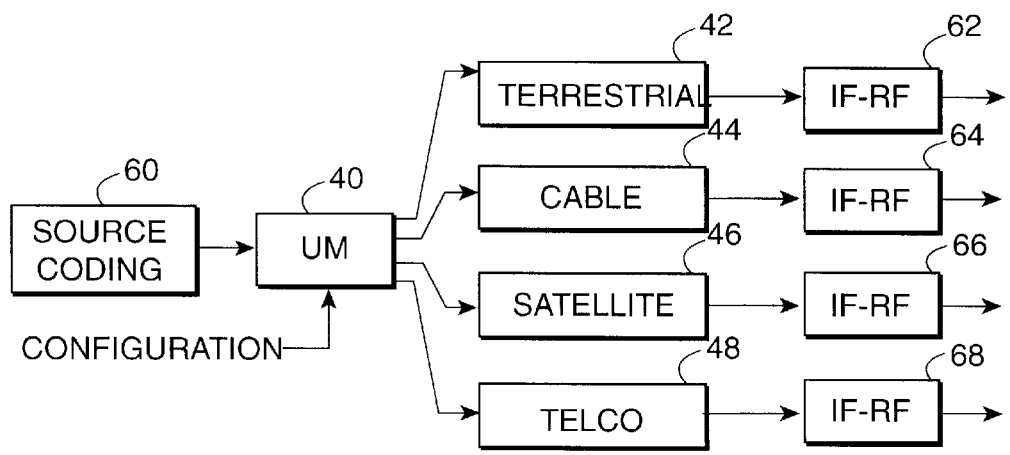
FIG. 4 is a block diagram of the transmit side for the subject universal modem in which the universal modem is utilized to encode signals in accordance with the intended modulation mode of the signal.

Referring now to FIG. 4, on the transmit side of the universal modem, source coding 60 is coupled to universal modem 40 which in turn configures the modulator in the modem to output bit streams having the required modulation format dependent on the media, namely, terrestrial 42, cable, 44, satellite 46 and landline 48. Here, the modulator is software-configurable, which eliminates the requirement for a plurality of modulators. It will thus be appreciated that modem 40 reformats the program material or video source from source coding 60 so as to put the material into a modulation format which is compatible with the particular medium over which the information is to be transmitted. In general, modem 40 performs function of channel coding, with the channel dictating the particular modulation format. As can be seen, the output of modem 40 is provided to that IF-RF converter 62, 64, 66 and 68 required for the associated media.

There are several advantages of having a software reconfigurable modulator:

First, when used in multimedia applications, the role of the universal modem is of a network interface module. In addition to having the capability of receiving from multiple transmission media applying different modulations, it allows the user to send signals, such as request for data or audio/video services, via different return channels having different modulation platforms. This not only increases the flexibility and mobility of the device, it also benefits the optimization of return channel bandwidth and utilization efficiency.

Secondly, when used in broadcast services, the universal modem provides a low cost modulation platform which can be changed under software control from one modulation format to another. This benefits regional stations which typically have a small number of channels to provide service with, but obtain their programs from more than one service provider and network involving multiple modulation types.

Thirdly, the advantages for PCS referred to hereinabove include the ability to instantly switch from one format to another when roaming, depending on the area the cell phone is in, thus to switch from TDMA to CDMA and vice versa as an example. Note that the CDMA system is described in U.S. Pat. No. 5,103,459 entitled SYSTEM AND METHOD FOR GENERATING SIGNAL WAVE FORMS IN A CDMA CELLULAR TELEPHONE SYSTEM.

Figure 5A:
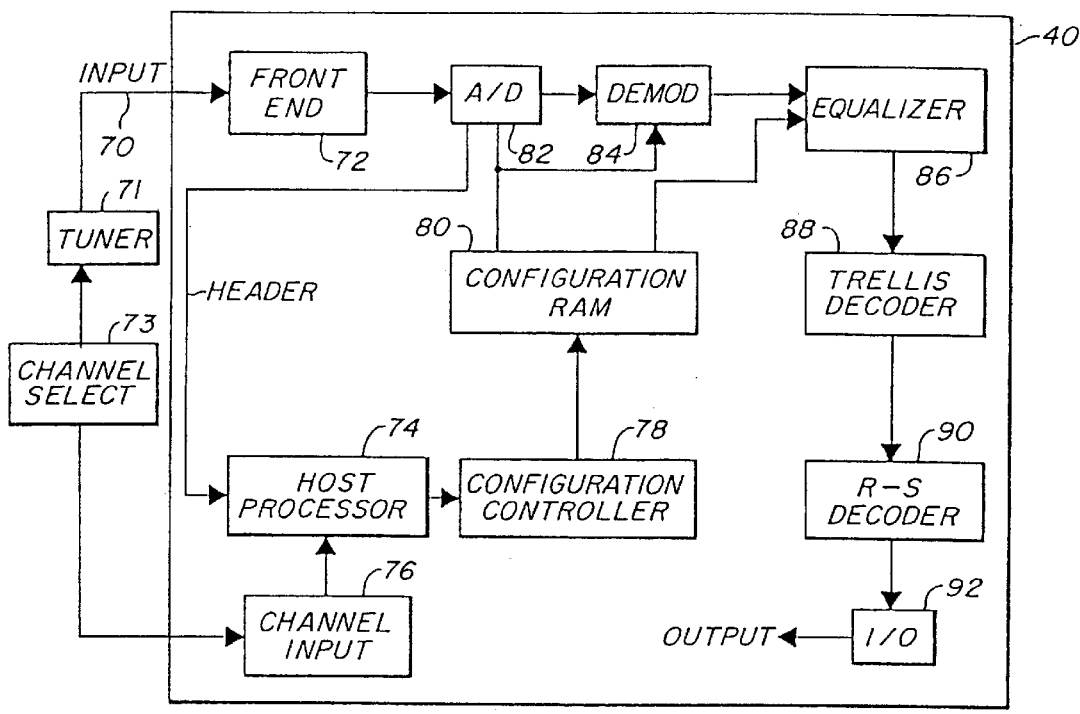
FIG. 5A is a block diagram of one embodiment of the receive side of the subject universal modem indicating the utilization of a configuration controller, configuration RAM and a configurable demodulator in combination with an equalizer, a Trellis Decoder, and an R-S Decoder.

Referring now to FIG. 5A, in one embodiment, the receive side of the universal modem includes an input 70 from tuner 71 which is coupled to a front end 72 whose primary purpose is level adjustment, amplification and filtering of the incoming signals from the tuner. Note that the tuner is set to a given channel by channel select 73. The output of front end 72 is coupled to A-D converter 82, and thence to software-configurable demodulator 84. Additionally, in one embodiment, the header of the input signal is stripped off and provided to a host processor 74 which determines from flags in the header the modulation format type. Alternatively, the host processor can determine the modulation format through channel input 76 from the channel select 73. In either event, the output of the host processor specifies the modulation format to a configuration controller 78, the purpose of which is to select from a configuration RAM 80 the appropriate demodulation mode to be downloaded to demodulator 84.

In one embodiment, demodulator 84 is provided with an array of gates, arithmetic logic units or ALUs, registers and other circuit blocks, elements or modules which can be connected together to provide a circuit to recover the associated carrier. In a preferred embodiment, at a higher level, the demodulator is configured in layers, with each layer containing gates and logic as well as filtering to provide a circuit specially tailored for carrier recovery of a different modulation format type. The configuration RAM therefore merely selects which of the layers is to be activated, thereby, taking advantage of the embedded logic in each of the layers.

In a VLSI realization of the universal modem, the universal modem hardware is realized in a VLSI chip, using the logic implemented with DRAM technology and hardware-software codesign. In one embodiment, the communication between the configuration control and the host processor is provided by an $I^2C$ bus. The configuration RAM can be implemented with either DRAM- or SDRAM technology, with the latter ensuring faster execution, which is desirable if the amount of data to be stored is very large.

Put another way, the building blocks, elements or modules within the demodulator are quite similar across the entire spectrum of modulation formats. This being the case, these blocks, elements or modules are capable of being connected together in a different manner for each of the modulation types. Thus, the configuration RAM 80 instructs demodulator 84 as to how it is to be reconfigured for the particular modulation type.

As mentioned hereinbefore, for over-the-air applications, the output of demodulator 84 is coupled to an equalizer 86 which, in one application, is utilized for ghost cancellation or to reject intersymbol interference. The output of equalizer 86 is coupled to a Trellis Decoder, the purpose of which is to eliminate errors in the bit level of the incoming signal, whereas a Reed-Solomon Decoder 90 is utilized to remove byte level errors. The output of decoder 90 is coupled to I/O 92 which forms the output of the demodulation section of the subject universal modem.

Figure 5B:
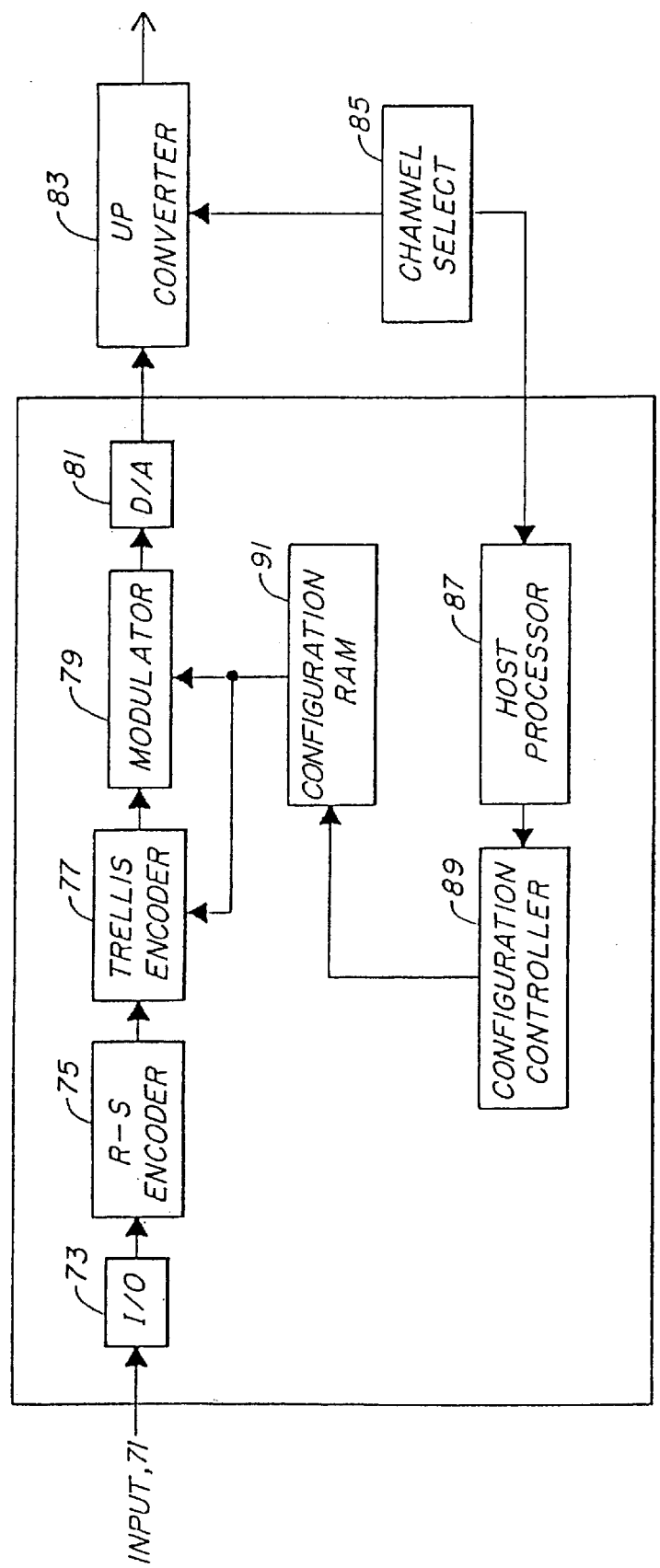
FIG. 5B is a block diagram of one embodiment of the transmit side of the subject universal modem indicating the use of a configuration controller coupled to a configuration RAM in which the modulation format is set in accordance with the desired transmit channel.

Referring now to FIG. 5B, on the transmit side, the universal modem, in one embodiment, has an input 71 coupled to an I/O stage 73, which is in turn coupled to an R-S encoder 75. This encoder is in turn coupled to a Trellis encoder 77 which is then coupled to a software-configurable modulator 79. The output of modulator 79 is coupled to a digital-to-analog converter 81 and thence to an UP converter 83 under the control of a channel select unit 75. The channel assigned to the transmitted signal is selected and the output of D/A converter 81 is upconverted to the appropriate carrier frequency.

As mentioned before, the modulation type or format is correlatable to the transmit channel. The software-configurable modulator is set in accordance with the selected channel by use of a host processor 87 which reads out channel select 85. Host processor 87 outputs the channel to a configuration controller 89 which drives a configuration RAM 91 to configure modulator 79 to the appropriate format. Configuration RAM 91 also sets Trellis encoder 77 to the appropriate channel.

In this way, the modulation section of the universal modem is software-configurable to a predetermined format, in one instance, correlated to the transmit channel. The software-configurable modulator is then quite flexible.

Figure 6:
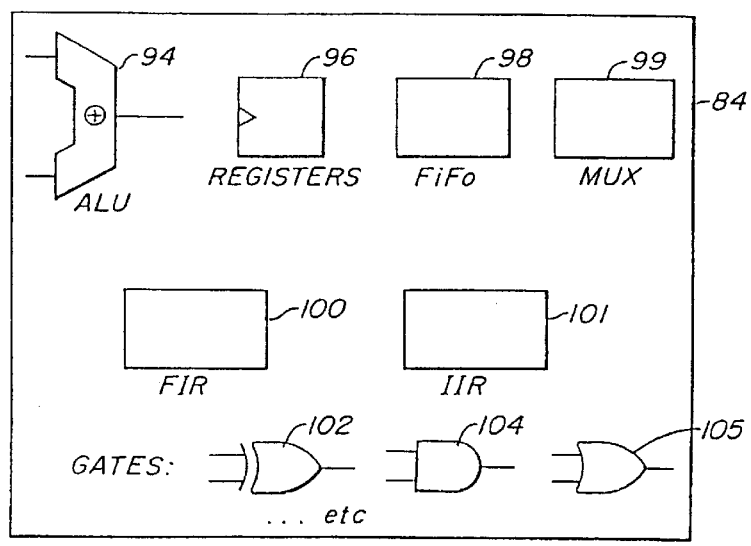
FIG. 6 is a diagrammatic representation of the configurable demodulator of FIG. 5A.

Referring now to FIG. 6, demodulator 84 typically includes blocks, elements or modules such as arithmetic logic unit 94, a number of registers 96, at least on First-In-First-Out or FIFO memory 98, multiplexers 99, one or more finite impulse response filters 100, and one or more infinite impulse response filters 101 as well as numerous gates 102, 104 and 105 which may be NOR gates, AND gates, OR gates or any of the typical logic level devices.

It is the purpose of the demodulator to extract carrier and timing information. How this is accomplished is in major part due to the particular type of finite impulse response filter employed. The combination of ALU registers, FIFO's, multiplexers, and gates as well as finite impulse response and infinite impulse response filters is that which successfully demodulates the signal, with interconnection of these devices being under the control of configuration RAM 80 of FIG. 5.

Figure 7:
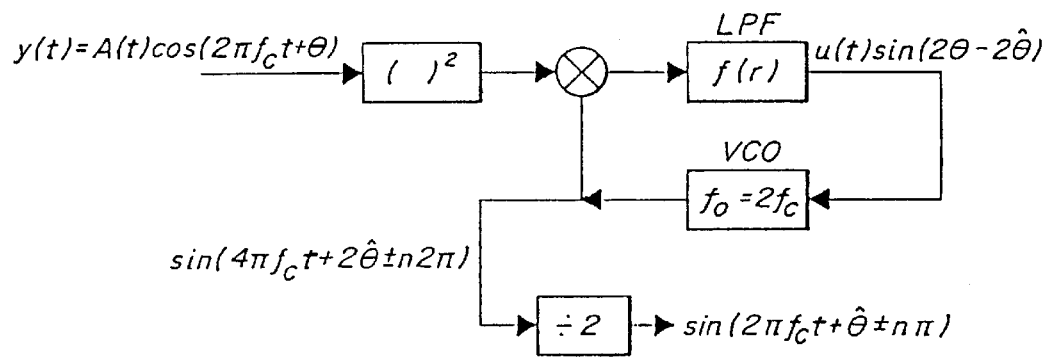
FIG. 7 is a schematic diagram of a typical squaring/phase locked loop carrier recovery system to which the demodulator of FIG. 5A can be configured.

Referring now to FIG. 7, a typical squaring loop carrier recovery system is illustrated in which the functions performed by the low pass filter and the voltage control oscillator as well as the divide-by-two circuit, the mixer and the squaring circuit can be replicated in a single reconfigurable chip so that all of these blocks can be connected together on the fly.

Figure 8:
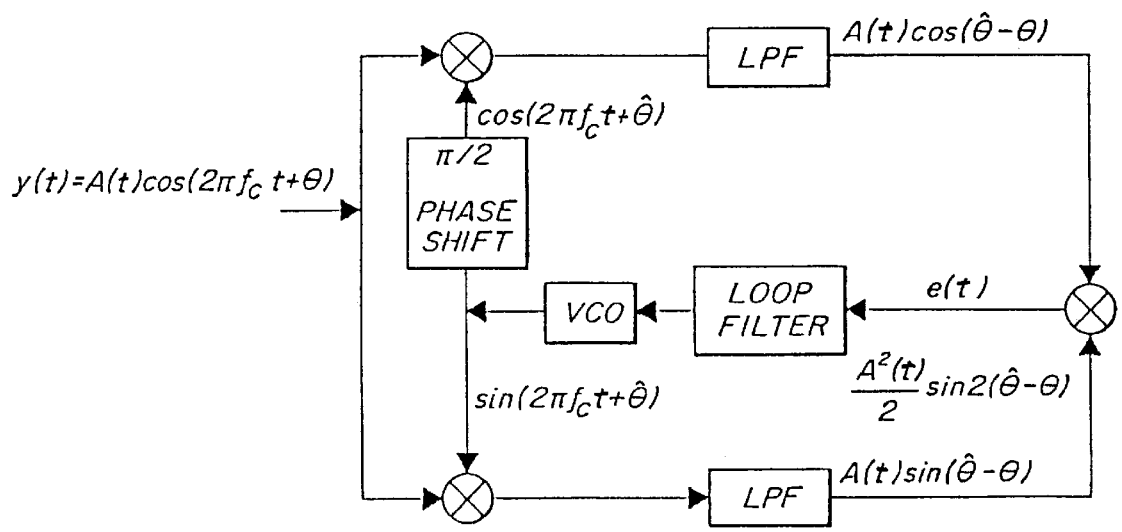
FIG. 8 is a schematic diagram of a typical Costas loop carrier recovery system to which the demodulator of FIG. 5A can be configured.

Referring now to FIG. 8, likewise in Costas loop carrier recovery, the phase shifter, low pass filter, VCO, loop filter as well as the mixer elements are available as blocks in the demodulator which, when connected as illustrated, provides for the carrier recovery functions. Note, this circuit is a typical Costas loop device for tracking the phase of a double-sided surpressed-carrier signal which is equivalent to the squarer/Phase Lock Loop System of FIG. 7.

Referring now to FIG. 9, this drawing shows an embodiment of the demodulation algorithm for demodulator 84 of FIG. 5A for demodulating QPSK/QAM signals. It will be appreciated that this algorithm can be broken down into elements or blocks which form demodulator 84 in FIG. 5A. However, this algorithm can also be implemented in software such that the demodulator is software-configurable. Moreover, equalizer 86, Trellis decoder 88 and R-S decoder 90 can be implemented in software and appropriately configured. Note that an advantage of the software implementation is flexibility.

Figure 10:
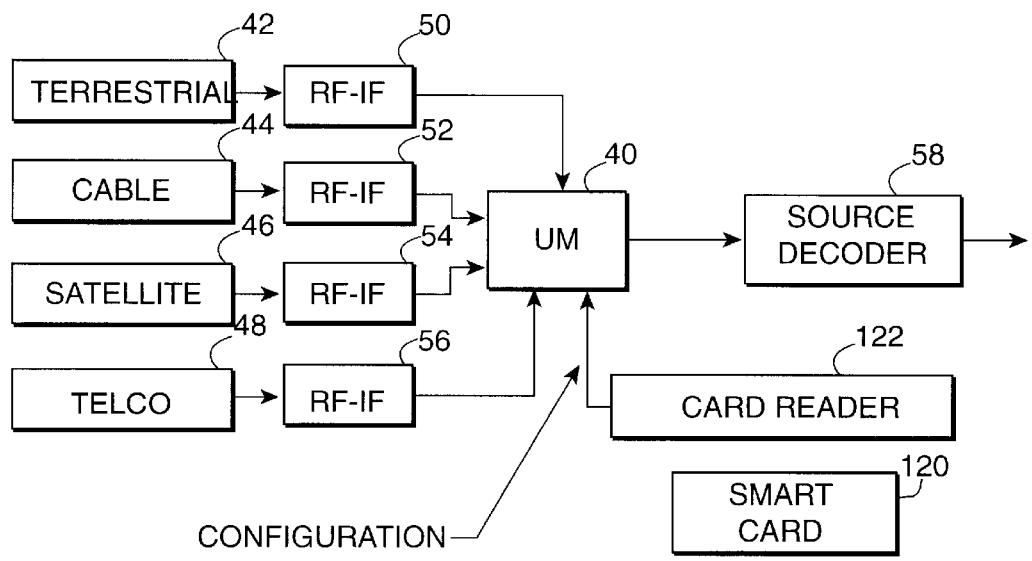
FIG. 10 is a block diagram of a smart card system for setting the software configurable logic unit of the demodulator of FIG. 3.

As to further systems for setting demodulation type or format, and referring now to FIG. 10, it is possible to configure universal modulator 40 utilizing a so-called "smart card" 120 and a card reader 122. In this embodiment, the card has a priori knowledge of the modulator type or format expected and is used to set the software-configurable logic in the modem. This eliminates the necessity of detecting modulation type or format while at the same time offering a billing function, since the use of the smart card and its embedded information can be detected.

Figure 11:
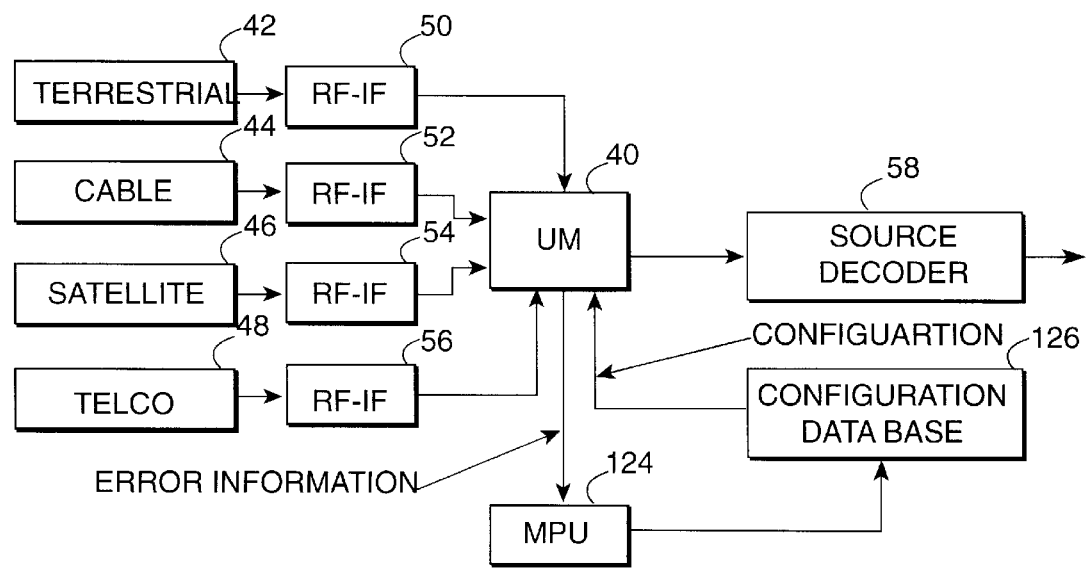
FIG. 11 is a block diagram of a system for detecting modulation types based on an error signal which is the result of demodulating all possible modulation types.

Referring now to FIG. 11, it is also possible to detect modulation type or format trough initially demodulating all modulation types, detecting the error at MPU 124 and using a configuration database 126 to change the software-configurable logic to that modulation type or format having the lowest error. Note that initial multiple modulation type demodulation can be in parallel or serial.

Figure 12:
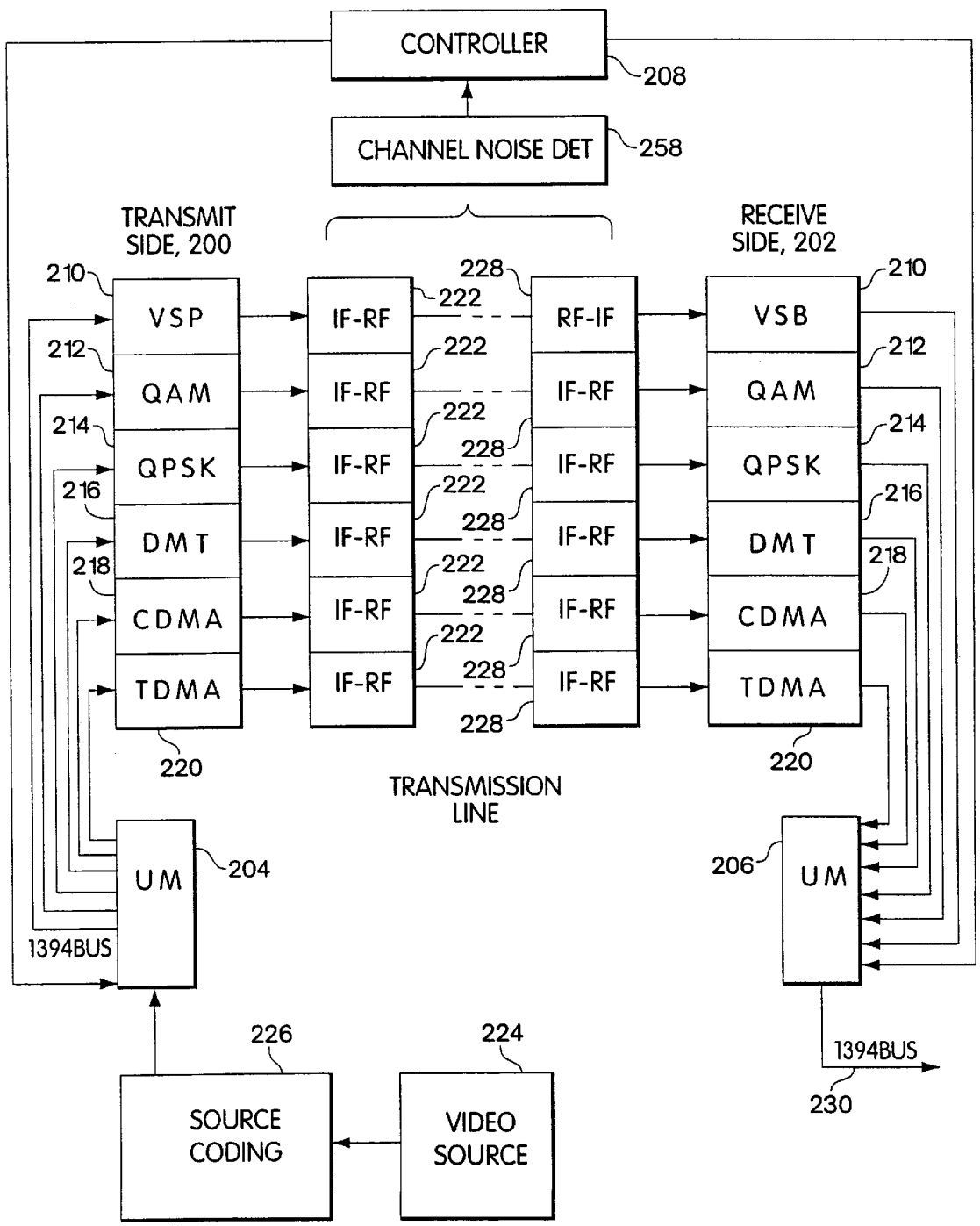
FIG. 12 is a block diagram showing a controller for controlling modulation at both the transmit and receive sides of the system.

Referring now to FIG. 12, a technique for detection of modulation types by the receiver involving the control of both the transmit side and the receive side and the use of modulation flags is presented. As can be seen, there is a transmit side 200 and a receive side 202, each having respective universal modems 204 and 206. A controller 208 is used to control universal modems 204 and 206 to set modulation type as illustrated at 210220. Signals with the indicated modulation type are coupled to respective IF-RF stages 222. Note that a video source 224 is coupled to source coding 226 which is coupled to universal modem 204 to provide source material for transmission.

On the receive side, IF-RF stages 228 receive the transmission, with the received signals having formats 210–220. These signals are coupled to universal modem 206, with the decoded output placed on a bus 230, in one embodiment a 1394 bus.

Figure 13:
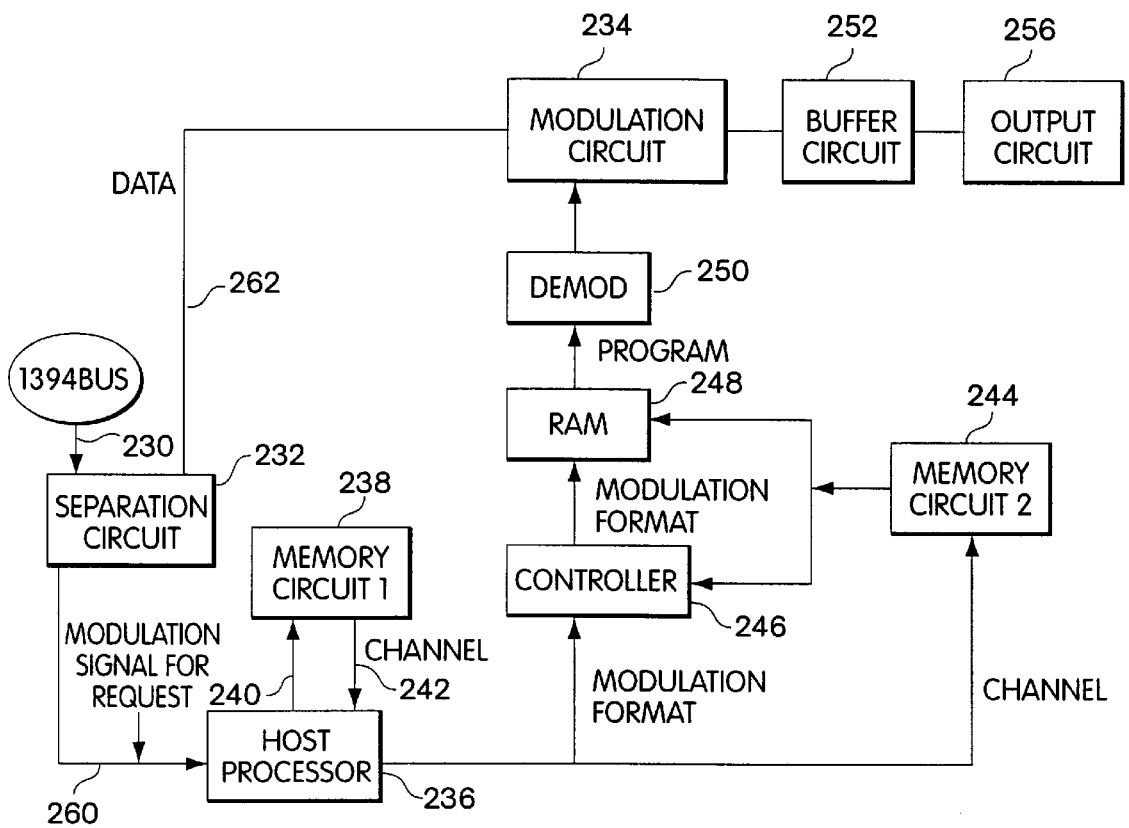
FIG. 13 is a block diagram of the universal modem of FIG. 10 indicating a 1394 bus structure, a separation circuit and a number of memories.

Referring now to FIG. 13, the universal modulation of FIG. 12 in one embodiment contains a separation circuit 232 coupled to modulation circuit 234 and a host processor 236. A Memory Circuit #1, memory 238, is coupled to host processor 236 over modulation signal line 240 and channel line 242 to provide, channel, format and frequency bandwidth. Host processor 236 provides channel information to Memory Circuit #2, memory 244 and format information to controller 246 and RAM 248. Memory Circuit #2 is coupled to controller 246 and RAM 248 to provide channel information, with RAM 248 providing a program to modulation circuit 234, the output of which is buffered at 252 and outputted at 256.

In operation, when used in receivers, the universal modem needs to first detect the modulation type used by the incoming signals so that it can correctly choose the corresponding demodulator configurations. In one embodiment, this is done by adding modulation flag bits to the beginning of the transmitted data stream. Note that 3 bits allows up to 8 different modulation types. In what follows these bits are designated as modulation header words.

In one embodiment, the header is always modulated using QPSK, and it is repeated periodically during the transmission of the data signal. Therefore, it is always possible for a receiver to properly demodulate the header. As will be appreciated, this design requires that the above mentioned receiver configures into a QPSK demodulation mode upon power up and reconfigures itself, if necessary, after successful detection of the header word.

In order to establish reliable communication, in one embodiment the reconfigurable nature of the universal modem has the potential of improving reliability of communications by switching to a different modulator type when a predetermined noise level is detected. This is achieved in the following way. When two devices, both employing universal modems, communicate with each other, it is possible to switch to modulation type in response to the detection of deterioration of communications. This is accomplished in one embodiment with a channel noise detector 258 coupled to controller 208 that detects noise on the channel. Controller 208 then specifies the appropriate modulation format, frequency and bandwidth to provide more reliable communication over the channel.

In the above described embodiment, the universal modem covers VSB, QAM, QPSK, DMT, CDMA and TDMA modulations and includes the 1394 bus 230 to provide a fast protocol for video data communications and a frame of signals in the aforementioned CDMA format.

More specifically, predetermining the modulation type for each channel between a transmitter and a receiver, a controller such as controller 208 controls the modulation type of universal modem 204 or 206 at both the transmitter and the receiver sides.

Specifically, as can be seen in FIG. 12, each modulation type is predetermined between each transmitter and receiver. For example, VSB for Channel 1, QAM for Channel 2, QSPK for Channel 3, DMT for Channel 4, CDMA for Channel 5 and TDMA for Channel 6.

Universal modem 204 at the transmitter side inputs a modulation request signal over line 260 and data signal over line 262 such as voice or image outputted from source coding 226. For example, the modulation request signal and data signal are transmitted as a frame when they are transmitted to universal modem 204 through 1394 bus 230.

First, as to the transmitting side and referring now to FIG. 12, a detailed circuit of UM204 in the transmitter is shown which generates a frame signal from Source coding 226.

As can be seen from FIG. 13, in one embodiment the frame signal is divided into a modulation request signal and a data signal by separation circuit 232. The data signal is outputted to modulation circuit 234. On the other hand, the modulation request signal is outputted to host processor 236.

Processor 236 accesses a Memory Circuit #1 after receiving the modulation request signal. Memory Circuit #1 has the information reflecting the modulation form for each Channel as illustrated in FIG. 14, such as VSB for Channel 1, QAM for Channel 2, QSPK for channel 3, DMT for Channel 4 and TDMA for Channel 6.

Controller 208 can change the information contained in Memory Circuit #1 freely, and gives the same order to the receiver. For example, controller 208 can increase channels, with increasing of modulation forms, or it can also change the number of a modulation form. In other words, controller 208 changes the contents of at least one memory, e.g., Memory Circuit #1, Memory Circuit #2 or any other Memory Circuit such as those associates with the receive side, it must change all of those memories. To accomplish this, processor 236 outputs a modulation format to controller 246. The frequency and the bandwidth for each channel are memorized in advance, as shown in FIG. 15. Note, one can change the content of all memories in accordance with the output from controller 208. When controller 208 changes, it also conveys these changes to the memory in universal modem 206 of the receiver. For example, the frequency can be established to be 25 MHz and the bandwidth 10 Khz, with CDMA being the modulation type.

Note that controller 246 transmits a modulation format to RAM 248. RAM 248 has a program to configure modulation circuit 234 for every modulation form, e.g., VSB, QAM, QPSK, DMT, CDMA, TDMA, or other modulation type. Receiving the format, controller 246 calls the program for the modulation circuit for the particular modulation format selected and outputs this format to RAM 248 which configures a modulation logic circuit in modulation circuit 234 according to the modulation frquency information and the program.

Figure 16:
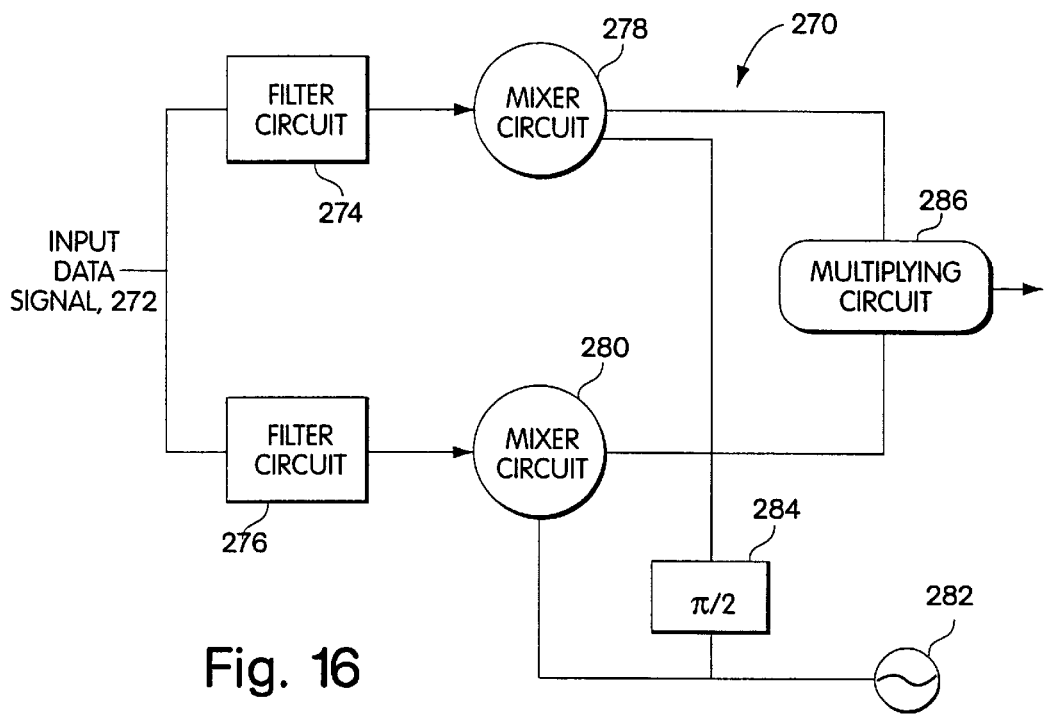
FIG. 16 is a block diagram of a TDMA modulation circuit for use in the universal modem of FIG. 13.

A typical TDMA modulation logic circuit 270 is shown in FIG. 16 as an example.

Circuit 270 modulates an input data signal 272 divided by the separation associated with the modulation logic circuit of modulation circuit 234 and the modulation frequency information from Memory Circuit #2. This is accomplished by coupling the input data signal to two filter circuits 274 and 276 respectively. The outputs of filters 274 and 276 are mixed at 278 and 280 respectively with a phase shifted signal from phase shifter 284, with the mixer circuit outputs added at adder 286.

Figure 17:
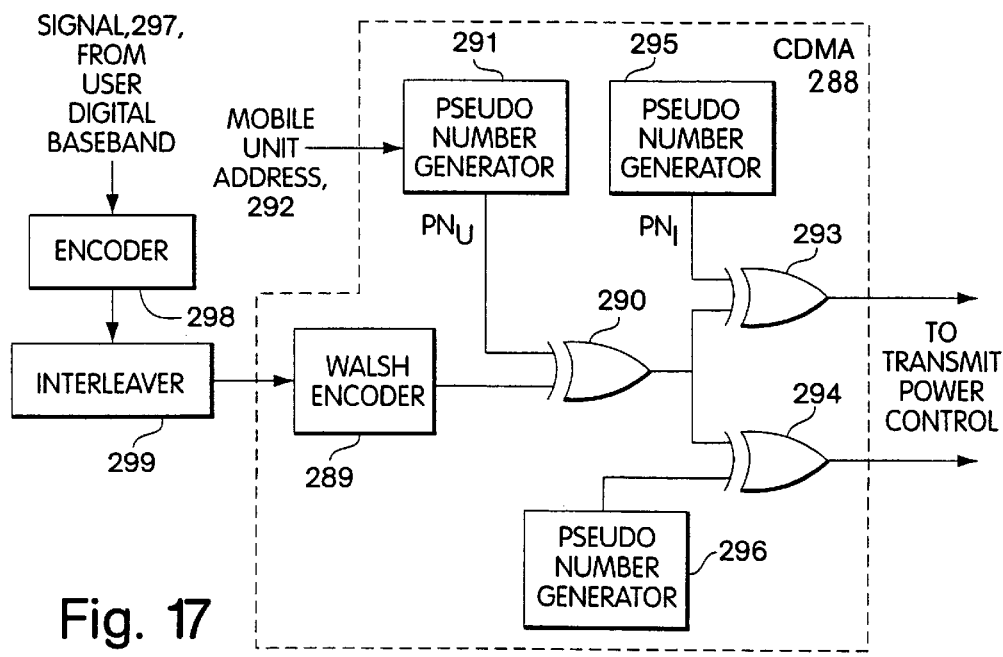
FIG. 17 is a block diagram of a CDMA modulation circuit for use in the universal modem of FIG. 13.

A typical CDMA modulation circuit is shown in FIG. 17 as an example.

Here, it can be seen that a CDMA circuit 288 includes a Walsh encoder 289 coupled to an NOR gate 290 having its other input coupled to a pseudo noise or PN generator 291 having an output $Pn_u$ coupled to NOR gate 290 and a mobile unit address 292 is coupled. The output of NOR gate 290 is coupled in parallel to NOR gates 293 and 294 having their other inputs coupled respectively to pseudo noise or PN generator 295 and 296.

A signal 297 from USEP digital baseband is coupled to an encoder 298 coupled to an interleaver 299 coupled to Walsh encoder 289.

Figure 18:
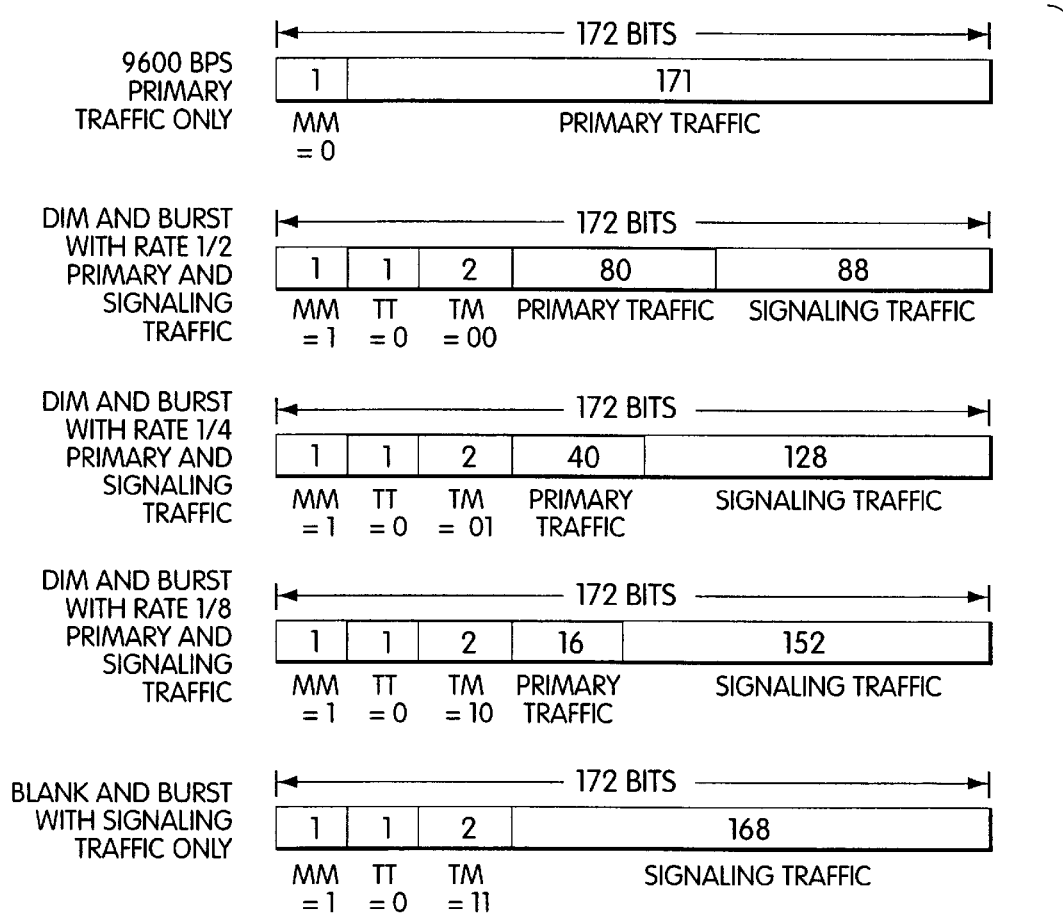
FIG. 18 is a table showing a CDMA signal and data format.

A signal of CDMA form is shown in FIG. 18 as an example of a framed signal.

As to the receive side, the signals from the modulator of the transmitting side are inputted to the receiving side. The receiver side detects the type of modulation and configures the demodulating logic circuit and outputs this for further processing.

Figure 19:
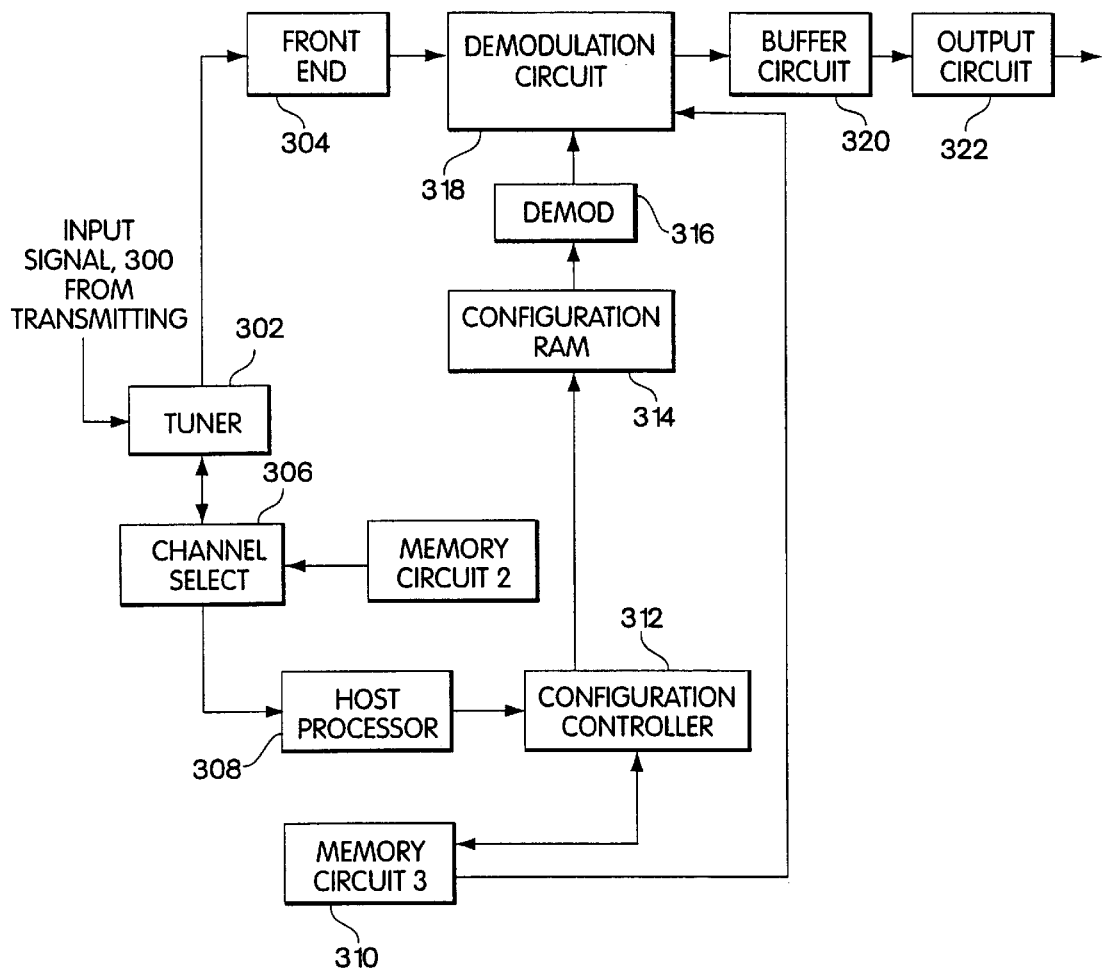
FIG. 19 is a block diagram of another embodiment of the universal modem of FIG. 13 in which there is no carrier and timing recovery; and, FIG. 20 is a table correlating channel, format, frequency and bandwidth for a third memory of the universal modem of FIG. 19.

The demodulating is done with universal modem 206 in the receiver. The structure of universal modem 206 is shown in FIG. 19, with the operation thereof explained hereinafter.

As shown, an input signal 300 is coupled to a tuner 302. Tuner 302 couples input signal 300 to a FRONTEND unit 304. The functions of the FRONTEND unit are level adjustment, amplification, filtering and A/D conversion of the incoming signals from the tuner. The detailed description of the function of FRONTEND unit 304 is conventional and is therefore omitted.

Tuner 302 is connected to a channel select unit 306. The channel select is for adjusting the tuner to the desired frequency. In this embodiment, tuner 302 changes the frequency in the fixed interval according to the signals selected from 6 channels, with the interval being set in accordance with the bandwidth associated with six channels. When tuner 302 captures the channel of incoming signals 300, the changing of the frequency is stopped and the frequency of the captured incoming signal is coupled to host processor 308. Channel select unit 306 inputs the frequency information stored in Memory Circuit #2 which is similar to Memory Circuit #2, 244 of FIG. 13. The tuner searches the range of the frequency. Note that the content of Memory Circuit #2 in the receiver is the same as the content of Memory 2 in the transmitter. The content of Memory Circuit #2 in the receiver is changeable by controller 208.

With host processor 308 being connected to the Memory Circuit #3, here illustrated at 310, the contents of Memory Circuit #3 in the receiver are changeable and are under the control of controller 208. Host processor 308 detects the demodulation type corresponding to the channel from the channel select 306, with the demodulation format being coupled to a configuration controller 312. Configuration controller 312 access Memory Circuit #3 to obtain the frequency and the bandwidth, with the demodulation type, the frequency and the bandwidth subsequently coupled to RAM 314.

The content of Memory Circuit #3 is shown in FIG. 20, with the content of Memory Circuit #3 in the receiver being changeable by the controller.

RAM 314 stores a different kind of program for a modulation logic circuit in demodulation circuit 318 corresponding to the demodulation format, for example, VSB, QAM, QPSK, DMT, CDMA, and TDMA. The program for the modulation logic circuit is extracted from the RAM 314 and outputted to the demodulation circuit 318. Demodulation circuit 318 constructs the demodulation logic circuit based on both the frequency information and the program. The constructed demodulation circuit 318 output is coupled to buffer 320 and thence to output circuit 332.

Having now described a few embodiments of the invention, and some modification and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a network communications system in which information is transmitted from a send side to a receive side over a communications channel, an apparatus for improving system performance comprising:

means for sensing a channel parameter; and means for changing a modulation format of the transmitted information by generating instructions including modulation format configuration data, responsive to the sensed channel parameter, and having software-configurable logic means for changing the modulation format in accordance with the instructions, wherein said software-configurable logic means includes logic elements whose functionality is capable of being changed in software.

2. The apparatus of claim 1, wherein said modulation format changing means includes:

a universal modem at each of said sides, each universal modem providing different modulation formats for use in the modulation and demodulation of a signal, the universal modem at the transmit side including a modulator and the universal modem at the receive side including a demodulator;

means for generating, as an output, configuration instructions for said software-configurable logic means;

means for coupling said output to said software configurable logic means to configure said modems for the modulation format specified by said configuration instructions; and means responsive to the sensing of said channel parameter for causing said instruction generating means to change the modulation format generated by the universal modem at said send side and a demodulation format of the universal modem at said receive side to a changed format.

3. The apparatus of claim 2, wherein said detected parameter is channel noise, and wherein said changed format is one which minimizes the effects of channel noise.

4. The apparatus of claim 2, wherein said modulation format changing means includes:

means for generating a control signal for specifying modulation formats, each of said modems coupled to said control signal and providing respectively modulation and demodulation in accordance with the format specified by said control signal;

means for generating, as an output, different instructions for different modulation formats, each of said different instructions including modulation format configuration data based on the modulation format specified by said control signal;

a memory for storing said modulation format configuration data, said memory being coupled to an associated modem for supplying said modulation format configuration data thereto; and means responsive to said instructions to configure the associated modem for one of said different modulation formats in accordance with the configuration data included therein.

5. In a network communications system in which information is transmitted from a send side to a receive side over a communications channel, an apparatus for improving system performance comprising:

means for sensing a channel parameter; and means for changing a modulation format of the transmitted information by generating instructions including modulation format configuration data, responsive to the sensed channel parameter, wherein said modulation format changing means includes:

a universal modem at each of said sides, each universal modem providing different modulation formats for use in the modulation and demodulation of a signal, the universal modem at the transmit side including a modulator and the universal modem at the receive side including a demodulator, said modulator and demodulator each having software-configurable logic means for respectively providing modulation and demodulation of a signal;

means for generating, as an output, configuration instructions for said software-configurable logic means;

means for coupling said output to said software configurable logic means to configure said modems for the modulation format specified by said configuration instructions;

means responsive to the sensing of said channel parameter for causing said instruction generating means to change the modulation format generated by the universal modem at said send side and a demodulation format of the universal modem at said receive side to a changed format;

and wherein said software-configurable logic means includes a number of elements, each performing a different modulation/demodulation function, and means for interconnecting said elements to perform in accordance with said configuration instructions.

6. The apparatus of claim 5, wherein said elements are taken from a group consisting of arithmetic logic units, registers, fifo buffers, gates, finite impulse response filters and infinite impulse response filters.

7. A system for communicating over a network, comprising:

a first modem including a first memory configured to store information corresponding to multiple modulation formats and a modulation circuit which is reconfigurable to modulate signals in any of the multiple modulation formats in accordance with the information stored in the first memory;

a second modem including a second memory configured to store information corresponding to the multiple modulation formats and a demodulation circuit which is reconfigurable to demodulate signals in any of the multiple modulation formats in accordance with the stored in the second memory; and a controller configured to direct changes in the information corresponding to the multiple modulation formats stored in the first and the second memories, such that the information stored in the first memory corresponds to the information in the second memory.

8. A system according to claim 7, wherein the controller is further configured to direct changes which include adding information corresponding to a new modulation format not previously included in the multiple modulation formats.

9. A system according to claim 7, wherein the modulation circuit is configured to modulate a first signal in a first of the multiple modulation formats and the demodulation circuit is configured to demodulate the first signal in the first modulation format, and further comprising:

a noise detector configured to detect noise in the first signal;

wherein, if the detected noise exceeds a threshold, the controller is further configured to direct the first modem to reconfigure the modulation circuit to modulate a subsequent signal in a second of the multiple modulation formats, which is different than the first modulation format, and to direct the second modem to reconfigure the demodulation circuit to demodulate the subsequent signal in the second modulation format.

10. A system according to claim 7, wherein the information includes at least one of frequency information and bandwidth information associated with each of the multiple modulation formats.

11. A method for communicating over a network, comprising:

storing information corresponding to multiple modulation formats in a first memory;

configuring a modulation circuit in accordance with the information stored in the first memory to modulate signals in any of the multiple modulation formats;

storing information corresponding to the multiple modulation formats in a second memory;

configuring a demodulation circuit in accordance with the information stored in the second memory to demodulate signals in any of the multiple modulation formats; and directing changes in the information corresponding to the multiple modulation formats stored in the first and the second memories, such that the information stored in the first memory corresponds to the information in the second memory.

12. A method according to claim 11, wherein the directed changes include directing additional information corresponding to a new modulation format not previously included in the multiple modulation formats to be stored in the first memory and the second memory.

13. A method according to claim 11, wherein the modulation circuit is configured to modulate a first signal in a first of the multiple modulation formats and the demodulation circuit is configured to demodulate the signal in the first modulation format, and further comprising the steps of:

detecting noise in the first signal;

determining if the detected noise exceeds a threshold;

reconfiguring the modulation circuit in accordance with the information stored in the first memory to modulate a subsequent signal in a second of the multiple modulation formats, which is different than the first modulation format, if the detected noise is determined to exceed the threshold; and reconfiguring the demodulation circuit in accordance with the information stored in the second memory to demodulate the subsequent signal in the second modulation format, if the detected noise is determined to exceed the threshold.

14. An apparatus for communicating over a network, comprising:

a demodulation circuit which is reconfigurable so as to correspond to any of multiple modulation formats and capable of receiving a signal having a data portion which is modulated in any one of the multiple modulation formats and a header portion which is modulated in only a single of the multiple modulation formats and identifies the data portion modulation format, wherein said demodulation circuit includes a number of software-reconfigurable logic elements for changing the modulation format; and a controller capable of directing the configuration of the demodulation circuit to correspond to the header portion modulation format in order for the header portion to be demodulated and the data portion modulation format to thereby be determined, and of directing the reconfiguration of the demodulation circuit to correspond to the determined data portion modulation format in order for the data portion to be demodulated and the data to thereby be determined.

15. An apparatus according to claim 14, wherein the multiple modulation formats include at least three modulation formats.

16. An apparatus according to claim 14, further comprising:

a memory configured to store information associated with each of the multiple modulation formats;

wherein the controller is further capable of directing the configuration of the demodulation circuit to correspond to the header portion modulation format in accordance with the stored information associated with the header portion modulation format and of directing the reconfiguration of the demodulation circuit to correspond to the determined data portion modulation format in accordance with the stored information associated with the data portion modulation format.

17. An apparatus for communicating over a network, comprising:

a modulation circuit which is reconfigurable so as to correspond to any of multiple modulation formats and capable of generating a signal having a data portion which is modulated in a first of the multiple modulation formats and a header portion which is modulated in a second of the multiple modulation formats, different than the first modulation format, and identifies the first modulation format, wherein said modulation circuit includes a number of software-reconfigurable logic elements for changing the modulation format; and a controller capable of directing the modulation circuit to be reconfigured to correspond to a first of the multiple modulation formats in order for a header portion of a signal to be modulated in the first modulation format and of directing the modulation circuit to be reconfigured to correspond to a second of the multiple modulation formats, different than the first modulation format in order for a data portion of a signal to be modulated in the second modulation format.

18. An apparatus according to claim 17, wherein the multiple modulation formats include at least three modulation formats.

19. An apparatus according to claim 17, further comprising:

a memory configured to store information associated with each of the multiple modulation formats;

wherein the controller is further capable of directing the reconfiguration of the modulation circuit to correspond to the first modulation format in accordance with the stored information associated with the first modulation format and the reconfiguration of the modulation circuit to correspond to the second modulation format in accordance with the stored information associated with the second modulation format.

* * * * *